United States Patent
Hinton et al.

(10) Patent No.: US 11,829,882 B2
(45) Date of Patent: *Nov. 28, 2023

(54) SYSTEM AND METHOD FOR ADDRESSING OVERFITTING IN A NEURAL NETWORK

(71) Applicant: Google LLC, Mountain View, CA (US)

(72) Inventors: Geoffrey E. Hinton, Toronto (CA); Alexander Krizhevsky, San Jose, CA (US); Ilya Sutskever, San Francisco, CA (US); Nitish Srivastava, Toronto (CA)

(73) Assignee: Google LLC, Mountain View, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 17/227,010

(22) Filed: Apr. 9, 2021

(65) Prior Publication Data

US 2021/0224659 A1  Jul. 22, 2021

Related U.S. Application Data

(63) Continuation of application No. 16/523,884, filed on Jul. 26, 2019, now Pat. No. 10,977,557, which is a continuation of application No. 15/222,870, filed on Jul. 28, 2016, now Pat. No. 10,366,329, which is a continuation of application No. 14/015,768, filed on Aug. 30, 2013, now Pat. No. 9,406,017.

(60) Provisional application No. 61/745,711, filed on Dec. 24, 2012.

(51) Int. Cl.
*G06N 3/082* (2023.01)
*G06N 3/045* (2023.01)
*G06N 3/047* (2023.01)
*G06N 3/084* (2023.01)

(52) U.S. Cl.
CPC ............. *G06N 3/082* (2013.01); *G06N 3/045* (2023.01); *G06N 3/047* (2023.01); *G06N 3/084* (2013.01)

(58) Field of Classification Search
CPC ........ G06N 3/082; G06N 3/047; G06N 3/045; G06N 3/084
See application file for complete search history.

(56) References Cited

PUBLICATIONS

Castellano, Giovanna, Anna Maria Fanelli, and Marcello Pelillo. "An iterative pruning algorithm for feedforward neural networks." IEEE transactions on Neural networks 8.3 (1997): 519-531. (Year: 1997).*

Zhang, Zhaozhao, and Junfei Qiao. "A node pruning algorithm for feedforward neural network based on neural complexity." 2010 International conference on intelligent control and information processing. IEEE, 2010. (Year: 2010).*

Hertz, John A. Introduction to the theory of neural computation. (Year: 1991).*

Breiman, "Bagging Predictors," Machine Learning, Aug. 1996, 18 pages.

(Continued)

*Primary Examiner* — Kevin W Figueroa
(74) *Attorney, Agent, or Firm* — Fish & Richardson P.C.

(57) ABSTRACT

A system for training a neural network. A switch is linked to feature detectors in at least some of the layers of the neural network. For each training case, the switch randomly selectively disables each of the feature detectors in accordance with a preconfigured probability. The weights from each training case are then normalized for applying the neural network to test data.

20 Claims, 2 Drawing Sheets

(56) References Cited

PUBLICATIONS

Breiman, "Random Forests," Machine Learning, Oct. 2001, 28 pages.

Castellano et al. "An iterative pruning algorithm for feed forward neural networks," IEEE transactions on Neural networks, May 1997, 13 pages.

Castellano et al., "An iterative pruning algorithm for feedforward neural networks." Neural Networks, IEEE Transactions on 8.3, May 1997, 519-531.

Ciresan et al., "Deep, Big, Simple Neural Nets for Handwritten Digit Recognition," Neural Computation, Dec. 2010, 22(12):3207-3220.

Coates et al., "The Importance of Encoding Versus Training with Sparse Coding and Vector Quantization, " ICML, Jan. 2011, 8 pages.

Dahl et al., "Context-Dependent Pre-Trained Deep Neural Networks for Large-Vocabulary Speech Recognition," IEEE Transactions on Audio, Speech, and Language Processing, Jan. 2012, 20:30-42.

Deng et al., "ImageNet: A Large-Scale Hierarchical Image Database," CVPR 2009, Jun. 2009, 248-255.

Duda, "NeuroXyce synapse device with STDP and stochastic transmission reliability," SAND report from Sandia National Laboratories, 2012, Retrieved from the Internet: URL:http://www.alexduda.com/2012_SAND.pdf [retrieved on Feb. 5, 2014.

Guo et al., "Stochastic resonance in Hodgkin-Huxley neuron induced by unreliable synaptic transmission," Journal of Theoretical Biology, 308:105-114, Jun. 9, 2012.

Hanson, "A Stochastic Version of the Delta Rule" Physica D, 1990, 8 pages.

Hinton et al., "Dropout: a simple and effective way to improve neural networks," The 26th annual conference on Neural Information Processing Systems (NIPS'25): Dec. 3-8, 2012, Dec. 6, 2012, Retrieved from the Internet: URL:http://videolectures.net/nips2012_hinton_networks/nips2012_hinton_networks_01.pdf, [retrieved on Apr. 7, 2014].

Hinton, "Training Products of Experts by Minimizing Contrastive Divergence," Neural Computation 14(8):1771-1800, Aug. 2002.

International Search Report and Written Opinion in International Application No. PCT/US2013/077608, dated Apr. 17, 2014, 11 pages.

Jacobs et al., "Adaptive Mixtures of Local Experts," Neural Computation 3, 79-87 (1991).

Jaitly et al., "Application of Pretrained Deep Neural Networks to Large Vocabulary Conversational Speech Recognition," Tech. Rep. 001, Department of Computer Science, University of Toronto, Mar. 12, 2012, 11 pages.

Krizhevsky, "Learning multiple layers of features from tiny images," Tech. Rep. 001, Department of Computer Science, University of Toronto, Apr. 8, 2009, 60 pages.

LeCun et al., "Gradient-based learning applied to document recognition," Proceedings of the IEEE 86(11):2278-2324, Nov. 1998.

Lewis et al., "Rcv1: A new benchmark collection for text categorization research," Journal of Machine Learning 5, 361-397 (2004).

Livnat et al., "A mixability theory for the role of sex in evolution," PNAS 105(50):19803-19808 (2008).

Mohamed et al., "Acoustic Modeling Using Deep Belief Networks," IEEE Transactions on Audio, Speech, and Language Processing, 20(1):14-22, Jan. 2012.

Neal, "Bayesian Learning for Neural Networks," Lecture Notes in Statistics No. 118 (Springer-Verlag, New York, 1996), 195 pages.

Rumelhart et al., "Learning representations by back-propagating errors," Nature 323:533-536, Oct. 9, 1986.

Salakhutdinov et al., "A Better Way to Pretrain Deep Boltzmann Machines," Artificial Intelligence and Statistics (2009), 9 pages.

Sanchez et al., "High-dimensional signature compression for large-scale image classification," CVPR 2011, Jun. 20-25, 2011, 1665-1672.

Srivastava, "Improving neural networks with dropout," Thesis for Master of Science at University of Toronto, Jan. 2013, Retrieved from the Internet: URL:http://wayback.archive.org/web/20130512061052/http://www.cs.toronto.edu/~nitish/msc_thesis.pdf [retrieved on Apr. 7, 2014].

Workshop on log-linear models at the 26th annual conference on Neural Information Processing Systems, Dec. 8, 2012, Retrieved from the Internet: URL:https://docs.google.com/file/d/0B_9blvt8HjXzbGJTZlpWczRyMGM/edit [retrieved on Apr. 7, 2014].

Zhang et al., "A node pruning algorithm for feedforward neural network based on neural complexity." 2010 international conference on intelligent control and information processing. IEEE, 2010. (Year: 2010).

\* cited by examiner

SYSTEM AND METHOD FOR ADDRESSING OVERFITTING IN A NEURAL NETWORK

CROSS-REFERENCE TO RELATED APPLICATIONS

This is a continuation of U.S. application Ser. No. 16/523,884, filed on Jul. 26, 2019, which is a continuation of U.S. application Ser. No. 15/222,870, filed on Jul. 28, 2016 (now U.S. Pat. No. 10,366,329), which is a continuation of U.S. application Ser. No. 14/015,768, filed on Aug. 30, 2013 (now U.S. Pat. No. 9,406,017), which claims priority to U.S. Provisional Application No. 61/745,711, filed on Dec. 24, 2012. The disclosures of the prior applications are considered part of and are incorporated by reference in the disclosure of this application.

TECHNICAL FIELD

The following relates generally to neural networks and more specifically to training a neural network.

BACKGROUND

A feedforward, artificial neural network uses layers of non-linear "hidden" units between its inputs and its outputs. Each unit has a weight that is determined during learning, which can be referred to as a training stage. In the training stage, a training set of data (a training set of inputs each having a known output) is processed by the neural network. Thus, it is intended that the neural network learn how to provide an output for new input data by generalizing the information it learns in the training stage from the training data. Generally, once learning is complete, a validation set is processed by the neural network to validate the results of learning. Finally, test data (i.e., data for which generating an output is desired) can be processed by a validated neural network.

The purpose of learning is to adapt the weights on the incoming connections of hidden units to learn feature detectors that enable it to predict the correct output when given an input vector. If the relationship between the input and the correct output is complicated and the network has enough hidden units to model it accurately, there will typically be many different settings of the weights that can model the training set almost perfectly, especially if there is only a limited amount of labeled training data. Each of these weight vectors will make different predictions on held-out test data and almost all of them will do worse on the test data than on the training data because the feature detectors have been tuned to work well together on the training data but not on the test data.

This occurs because of the overfitting problem, which occurs when the neural network simply memorizes the training data that it is provided, rather than generalizing well to new examples. Generally, the overfitting problem is increasingly likely to occur as the complexity of the neural network increases.

Overfitting can be mitigated by providing the neural network with more training data. However, the collection of training data is a laborious and expensive task.

One proposed approach to reduce the error on the test set is to average the predictions produced by many separate trained networks and then to apply each of these networks to the test data, but this is computationally expensive during both training and testing.

It is an object of the following to obviate or mitigate at least one of the foregoing issues.

SUMMARY

In one aspect, a system for training a neural network is provided, the system comprising a switch linked to a plurality of feature detectors of the neural network, the switch operable to randomly selectively disable each of the plurality of feature detectors for each of a plurality of training cases.

In another aspect, a method for training a neural network is provided.

DESCRIPTION OF DRAWINGS

The features of the invention will become more apparent in the following detailed description in which reference is made to the appended drawings wherein.

Like reference symbols in the various drawings indicate like elements.

DETAILED DESCRIPTION

Figure 1:
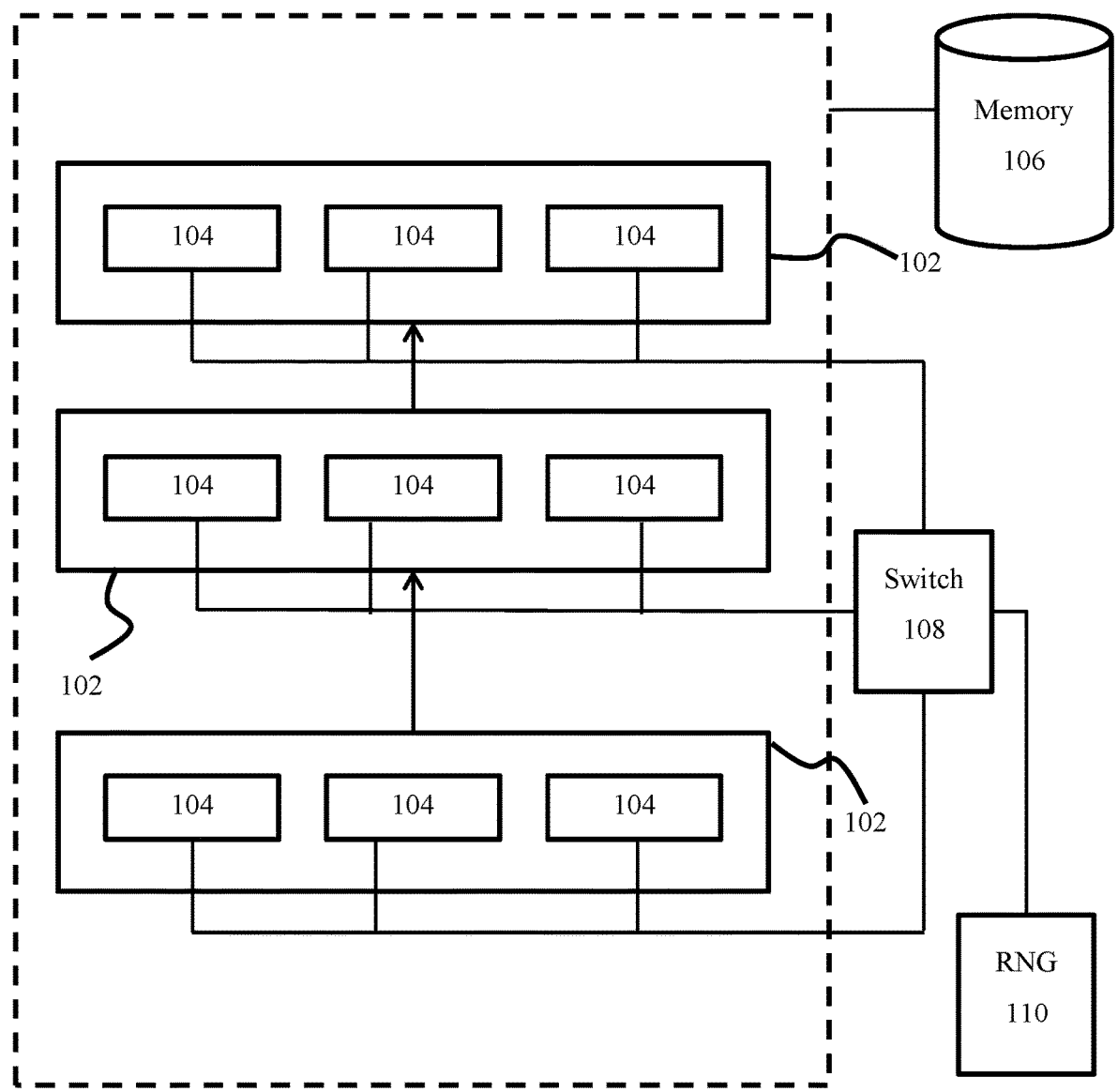
FIG. 1 is an architecture diagram of a system for training a neural network.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

It has been found that overfitting may be reduced by selectively disabling a randomly (or pseudorandomly)

selected subset of feature detectors in a neural network during each training case of the training stage, and adapting the weights of each feature detector accordingly during application of the neural network in the test stage. It has been found that the foregoing approach may prevent complex co-adaptations between feature detectors, for example where a particular feature detector is only helpful in the context of several other specific feature detectors. Although it is preferred that the selective disabling of feature detectors be changed for each training case, it is contemplated herein that co-disabling of particular feature detectors may be held constant for a plurality of training cases.

Referring now to FIG. 1, a feedforward neural network (100) having a plurality of layers (102) is shown. Each layer comprises one or more feature detectors (104), each of which may be associated with activation functions and weights for each parameter input to the respective feature detector (104). Generally, the output of a feature detectors of layer i may be provided as input to one or more feature detector of layer i+1.

The neural network is implemented by one or more processors. Each feature detector may be considered as a processing "node" and one or more nodes may be implemented by a processor. Further, a memory (106) may be provided for storing activations and learned weights for each feature detector. The memory (106) may further store a training set comprising training data. The training data may, for example, be used for image classification in which case the training data may comprise images with known classifications. The memory (106) may further store a validation set comprising validation data.

During the training stage, the neural network learns optimal weights for each feature detector. An optimal configuration can then be applied to test data. Exemplary applications of such a neural network include image classification, object recognition and speech recognition.

A switch (108) is linked to at least a subset of the feature detectors. The switch is operable to selectively disable each feature detector in the neural network to which it is linked, with a learned or preconfigured probability. A random number generator (110) is linked to the switch and provides the switch with a random value that enables the switch to selectively disable each linked feature detector. The possible values generated by the random number generator (110) each correspond to a decision of whether to disable any particular feature detector in accordance with the preconfigured probability.

In an embodiment, the switch (108) is linked to all feature detectors of the hidden layers. In another embodiment, the switch (108) is linked to all feature detectors of the input layers. In yet another embodiment, the switch (108) may be linked to all feature detectors in both the hidden and input layers. In yet further embodiments, the switch (108) may be linked to the feature detectors of a subset of the input and hidden layers. In another aspect, the switch may be connected to all hidden layers that are fully connected layers.

Figure 2:
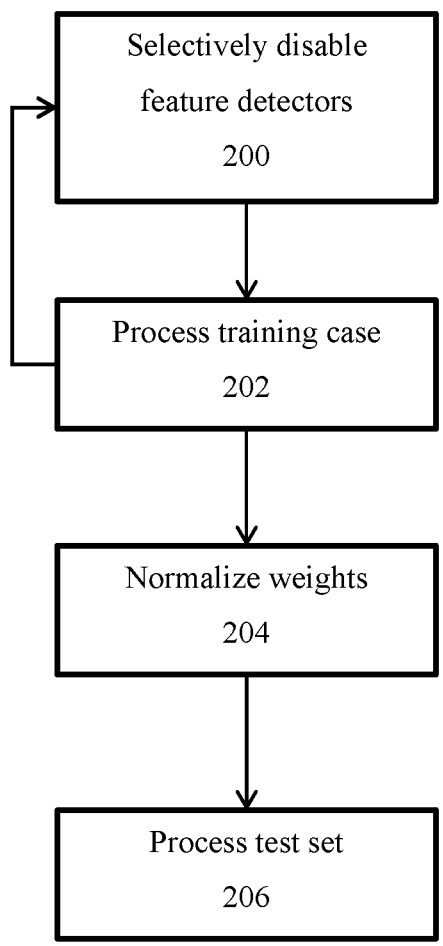
FIG. 2 is a flowchart for training a neural network.

Referring now to FIG. 2, during the training stage, a plurality of training cases are input, one at a time, to the neural network in order to train the neural network. For each such training case, the switch selectively disables a subset of the feature detectors to which it is linked (200). In particular embodiments, the switch is configured to disable each such feature detector in accordance with a preconfigured probability. In a more specific embodiment, feature detectors in hidden layers may be selectively disabled with probability 0.5 (that is, on average, each feature detector will be enabled for half of the training cases and disabled for the other half of the training cases) while feature detectors of input layers are disabled with probability 0.2 (that is, on average, these feature detectors will be enabled for 80% of training cases and disabled for 20% of training cases). Therefore, in this example, for each training case, each hidden layer feature detector is randomly omitted from the network with a probability of 0.5 and each input layer feature detector is randomly omitted from the network with a probability 0.2, so each hidden or input feature detector cannot rely on other hidden or input feature detectors being present. Thus, co-adaptation of feature detectors may be reduced.

Each training case is then processed by the neural network, one at a time (202). For each such training case, the switch may reconfigure the neural network by selectively disabling each linked feature detector.

Once the training set has been learned by the neural network, the switch may enable all feature detectors and normalize their outgoing weights (204). Normalization comprises reducing the outgoing weights of each feature detector or input by multiplying them by the probability that the feature detector or input was not disabled. In an example, if the feature detectors of each hidden layer were selectively disabled with probability 0.5 in the training stage, the outgoing weights are halved for the test case since approximately twice as many feature detectors will be enabled. A similar approach is applied to the input layers.

The test set may then be processed by the neural network (206).

It has been found that the foregoing method provides results similar to performing model averaging with neural networks but is operable to do so with increased efficiency. The described method may enable the training of a plurality of different networks in a reduced time as compared to model averaging.

In another aspect, a stochastic gradient descent process may be applied for training the neural network on mini-batches of training cases. However, in this example, the penalty term that is normally used to prevent the weights from growing too large may be modified, such that instead of penalizing the squared length (L2 norm) of the whole weight vector, an upper bound may be set on the L2 norm of the incoming weight vector for each individual hidden unit. If a weight-update violates this constraint, the incoming weights of the hidden unit may be renormalized by division. Using a constraint rather than a penalty prevents weights from growing very large regardless of how large the proposed weight-update is. Thus, it may be possible to start with a very large learning rate which decays during learning, thus allowing a thorough search of the weight-space.

Further, performance may be improved by implementing separate L2 constraints on the incoming weights of each hidden unit and further improved by also dropping out a random 20% of the pixels.

In further aspects, performance of the neural network on the test set may be improved by enhancing the training data with transformed images or by wiring knowledge about spatial transformations into a convolutional neural network or by using generative pre-training to extract useful features from the training images without using the labels, or a combination thereof.

The foregoing method may further be combined with generative pre-training, though it may be beneficial to apply a small learning rate and no weight constraints to avoid losing the feature detectors discovered by the pre-training fine-tuned using standard back-propagation.

In addition, for speech recognition and object recognition datasets the architecture of the neural network may be adapted by evaluating the performance of a plurality of the more optimal learned neural networks on the validation set and then selecting the architecture that performs best on the validation set as the one to apply to the test set.

In further examples, for datasets in which the required input-output mapping has several suitably different regimes, performance may be further improved by adapting the preconfigured probabilities to be a learned function of the input.

In another aspect, the switch may select hidden units in blocks so that all of the hidden units within a block are always either selected or not selected together. The blocks may comprise units in a single hidden layer or may comprise units in more than one hidden layer.

In another aspect, a plurality of switches may be provided to control blocks of hidden units or inputs, including blocks of size 1, and a hidden unit or input is only used in the forward pass if it is selected by all of the switches that are capable of selecting it.

Example embodiments are now described for applying the foregoing system to particular test data. However, it will be appreciated that alternative neural network configurations may be implemented for such test data, and further neural network configurations may be implemented for other applications. In addition, the type of neural network implemented is not limited merely to feedforward neural networks but can also be applied to any neural networks, including convolutional neural networks, recurrent neural networks, auto-encoders and Boltzmann machines.

What is claimed is:

1. A computer-implemented method comprising:
obtaining a plurality of training cases; and
training a neural network comprising a plurality of layers on the plurality of training cases, each of the layers comprising one or more feature detectors that are each associated with a respective probability of being disabled during processing of each of the plurality of training cases, wherein training the neural network on the plurality of training cases comprises, for each of the training cases respectively:
determining one or more feature detectors to disable during processing of the training case, comprising, for each feature detector of each of the plurality layers, determining whether to disable the feature detector based on the respective probability associated with the feature detector;
disabling the one or more feature detectors in accordance with the determining, and
processing the training case using the neural network with the one or more feature detectors disabled to generate a predicted output for the training case;
and after training the neural network, providing the trained neural network for processing test data with all of the one or more feature detectors in each of the plurality of layers enabled.

2. The method of claim 1, wherein training the neural network further comprises:
adjusting the weights of each of feature detectors to generate trained values for each weight in the set of weights corresponding to the feature detector.

3. The method of claim 2, further comprising:
normalizing the trained weights for each of the feature detectors in the subset, wherein normalizing the trained weights comprises multiplying the trained values of the weights for each of the one or more feature detectors in the subset by a respective probability of the feature detector not being disabled during processing of each of the training cases.

4. The method of claim 1, wherein a subset of the feature detectors includes feature detectors in a first layer of the plurality of layers and feature detectors in one or more second layers of the plurality of layers, wherein the feature detectors in the first layer are associated with a first probability and wherein the feature detectors in the one or more second layers are associated with a second, different probability.

5. The method of claim 4, wherein the first layer is an input layer of the neural network and the one or more second layers are hidden layers of the neural network.

6. The method of claim 4, wherein the first layer and the one or more second layers are hidden layers of the neural network.

7. The method of claim 1, wherein determining one or more feature detectors to disable during processing of the training case comprises:
determining to disable the same feature detectors that were disabled during processing of a preceding training case.

8. The method of claim 1, wherein the neural network is one of a feedforward neural network, a convolutional neural network, a recurrent neural network, an auto-encoder, or a Boltzmann machine.

9. A system comprising one or more computers and one or more storage devices storing instructions that, when executed by the one or more computers, cause the one or more computers to perform operations comprising:
obtaining a plurality of training cases; and
training a neural network comprising a plurality of layers on the plurality of training cases, each of the layers comprising one or more feature detectors that are each associated with a respective probability of being disabled during processing of each of the plurality of training cases, wherein training the neural network on the plurality of training cases comprises, for each of the training cases respectively:
determining one or more feature detectors to disable during processing of the training case, comprising, for each feature detector of each of the plurality layers, determining whether to disable the feature detector based on the respective probability associated with the feature detector;
disabling the one or more feature detectors in accordance with the determining, and
processing the training case using the neural network with the one or more feature detectors disabled to generate a predicted output for the training case;
and after training the neural network, providing the trained neural network for processing test data with all of the one or more feature detectors in each of the plurality of layers enabled.

10. The system of claim 9, wherein training the neural network further comprises:
adjusting the weights of each of the feature detectors to generate trained values for each weight in the set of weights corresponding to the feature detector.

11. The system of claim 10, the operations further comprising:
normalizing the trained weights for each of the feature detectors in the subset, wherein normalizing the trained weights comprises multiplying the trained values of the weights for each of the one or more feature detectors in the subset by a respective probability of the feature detector not being disabled during processing of each of the training cases.

12. The system of claim 9, wherein a subset of the feature detectors includes feature detectors in a first layer of the plurality of layers and feature detectors in one or more second layers of the plurality of layers, wherein the feature detectors in the first layer are associated with a first probability and wherein the feature detectors in the one or more second layers are associated with a second, different probability.

13. The system of claim 12, wherein the first layer is an input layer of the neural network and the one or more second layers are hidden layers of the neural network.

14. The system of claim 12, wherein the first layer and the one or more second layers are hidden layers of the neural network.

15. The system of claim 9, wherein determining one or more feature detectors to disable during processing of the training case comprises:
   determining to disable the same feature detectors that were disabled during processing of a preceding training case.

16. The system of claim 9, wherein the neural network is one of a feedforward neural network, a convolutional neural network, a recurrent neural network, an auto-encoder, or a Boltzmann machine.

17. A non-transitory computer storage medium encoded with a computer program, the program comprising instructions that when executed by one or more computers cause the one or more computers to perform operations comprising:
   obtaining a plurality of training cases; and
   training a neural network comprising a plurality of layers on the plurality of training cases, each of the layers comprising one or more feature detectors that are each associated with a respective probability of being disabled during processing of each of the plurality of training cases, wherein training the neural network on the plurality of training cases comprises, for each of the training cases respectively:
      determining one or more feature detectors to disable during processing of the training case, comprising, for each feature detector of each of the plurality layers, determining whether to disable the feature detector based on the respective probability associated with the feature detector;
      disabling the one or more feature detectors in accordance with the determining, and
      processing the training case using the neural network with the one or more feature detectors disabled to generate a predicted output for the training case;
   and after training the neural network, providing the trained neural network for processing test data with all of the one or more feature detectors in each of the plurality of layers enabled.

18. The computer storage medium of claim 17, wherein training the neural network further comprises:
   adjusting the weights of each of the feature detectors to generate trained values for each weight in the set of weights corresponding to the feature detector.

19. The computer storage medium of claim 18, the operations further comprising:
   normalizing the trained weights for each of the feature detectors in the subset, wherein normalizing the trained weights comprises multiplying the trained values of the weights for each of the one or more feature detectors in the subset by a respective probability of the feature detector not being disabled during processing of each of the training cases.

20. The computer storage medium of claim 17, wherein the subset includes feature detectors in a first layer of the plurality of layers and feature detectors in one or more second layers of the plurality of layers, wherein the feature detectors in the first layer are associated with a first probability and wherein the feature detectors in the one or more second layers are associated with a second, different probability.

* * * * *